May 6, 1952     J. J. PROHASKA     2,596,079
SKINNING KNIFE
Filed Aug. 23, 1950     2 SHEETS—SHEET 1
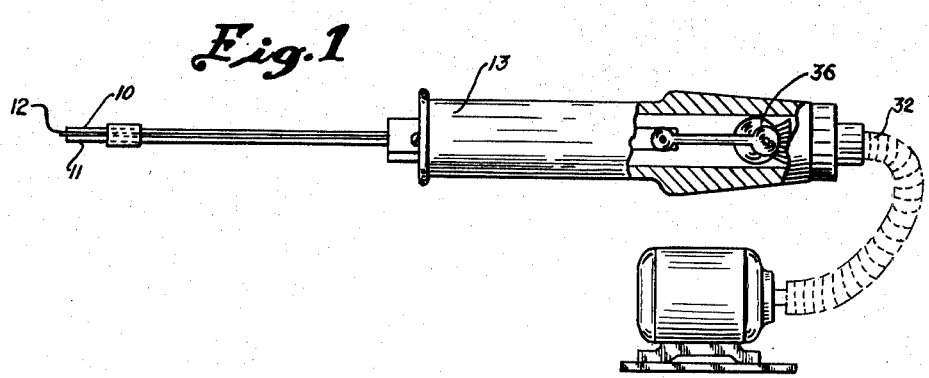
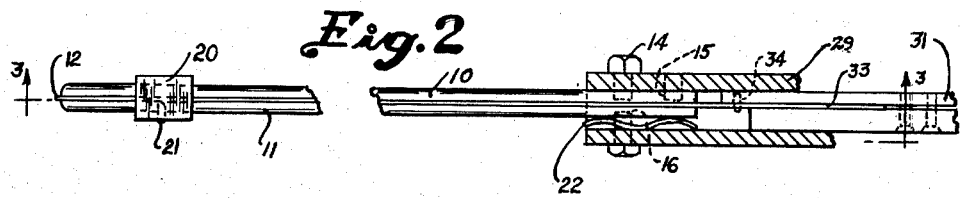
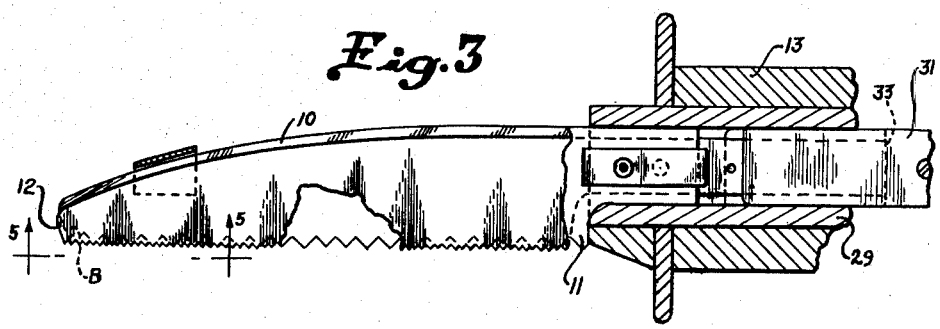
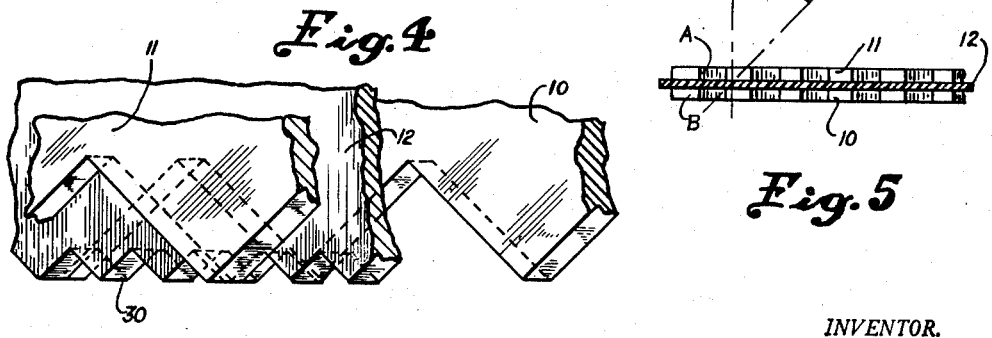
INVENTOR.
James J. Prohaska
BY
R. G. Story
ATTORNEY

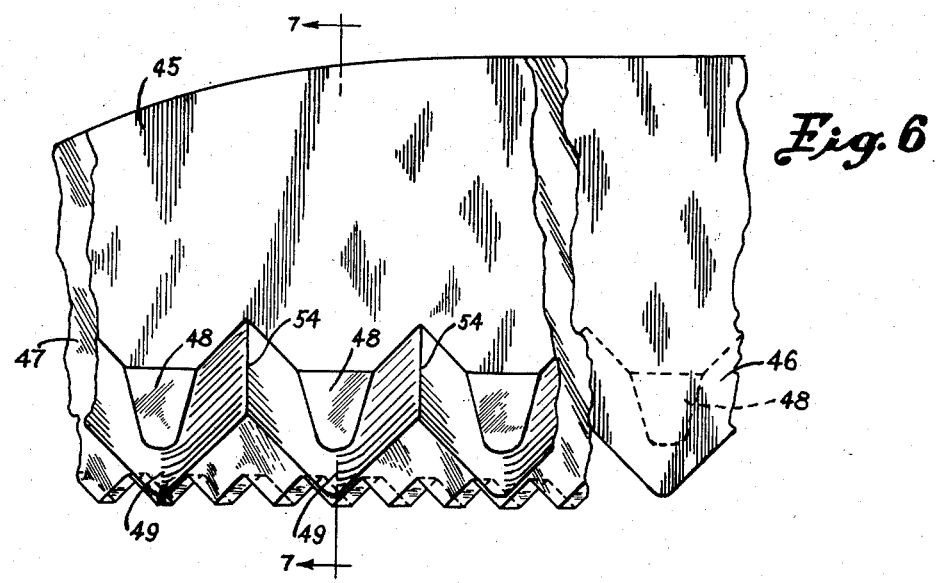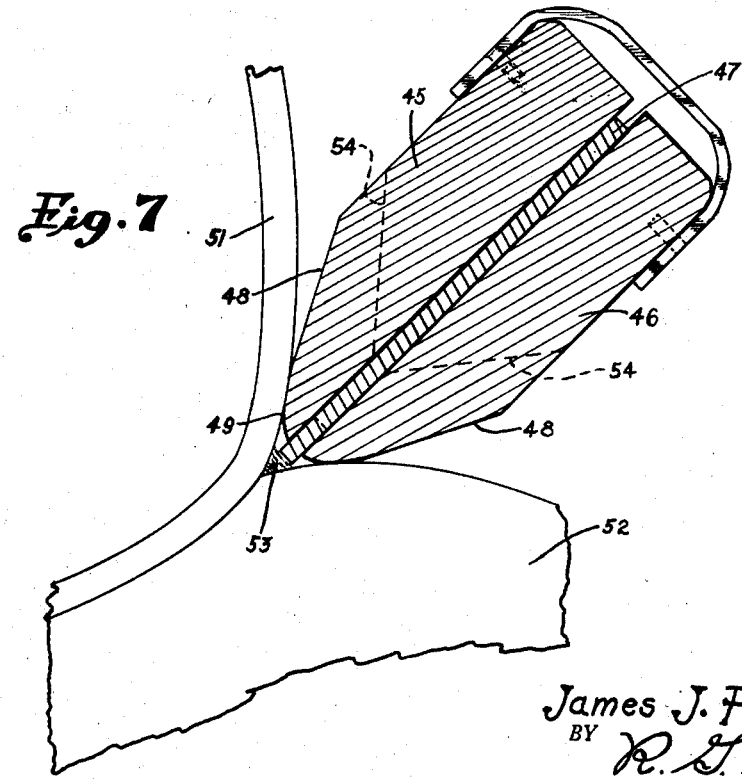
INVENTOR.
James J. Prohaska

Patented May 6, 1952

2,596,079

UNITED STATES PATENT OFFICE 2,596,079

SKINNING KNIFE

James J. Prohaska, La Grange, Ill., assignor to Swift & Company, Chicago, Ill., a corporation of Illinois Application August 23, 1950, Serial No. 181,015

5 Claims. (Cl. 30—272)

This invention relates to a skinning means and more particularly to a power-driven skinning knife.

The principal object of the present invention is to provide a power-operated skinning knife that will quickly and easily separate the hide from the remainder of the carcass without leaving an excess amount of flesh on the hide or damaging the hide during the removal operation. This is achieved through the use of a wedge-shaped cutting head which parts the skin and the flesh in the cut area to expose a small line of fibers between the skin and the flesh at the edge of the cut area, and allows the small cutting blade at the apex of the wedge to sever these fibers close to the skin. The sides of the cutting head form a guard to prevent the blade from reaching the skin, and the parting action achieved by the wedge-shaped head keeps the cutting blade centered along said line of fibers to be severed.

Additional objects and advantages include: to provide a power-driven skinning means having inherent safety features; to provide a skinning knife which automatically sharpens itself as it operates; to provide an improved cutting arrangement for severing the fell layer between the skin and the carcass of cattle and the like; and to provide an improved construction whereby a new cutting blade can be rapidly assembled in the power-driven cutting means to condition the device for use.

Other objects will appear from the specification below.

In the drawings:

Fig. 1 is a top plan view showing the handle, with the cutting means forming the subject of this invention extending outwardly therefrom;

Fig. 2 is a top plan view partly broken away showing the cutting means, including the mounting means for the knife blade on the end of the power-driven means;

Fig. 3 is a view taken on line 3—3 of Fig. 2;

Fig. 4 is a perspective view showing the relationship between the guard teeth and the cutter blade teeth;

Fig. 5 is a view taken along line 5—5 of Fig. 3;

Fig. 6 is a greatly enlarged elevational view of the teeth of the guard and cutting blades; and Fig. 7 is a transverse section of the guard and cutting blades in cutting position on a carcass.

The present application is a continuation in part of my prior application Serial No. 676,225.

Various means have previously been proposed as a substitute for the manual skinning of animals, and particularly cattle, but until the present development, no completely successful means have been found useful for commercial cattle-skinning operations. It is desirable to apply power to this cutting operation in order to speed it up and reduce the work which must be performed by hand. Such power means must be designed from the standpoint of safety to the operator and lightness for handling, coupled with the ability to perform a heavy-duty job. As above stated, many attempts have been made to solve the problem; however, all devices proposed to date have been rejected and, heretofore, even in the big packing plants, the skinning of cattle has been practiced almost entirely as a manual art.

The present invention has been made to provide a power means for this necessary cattle-skinning task and it embodies the features of durability and lightness, together with an improved cutting principle which has proven to be highly satisfactory. The device of this invention takes the form of a pair of guard members between which a cutting blade reciprocates. The edges of the guard members and the cutting blade are each serrated and the individual teeth of the serrated edges cooperate so that as the blade moves between the guards, fibers falling between the teeth are sheared between a blade tooth and a guard tooth. The guard members are supported from the handle of the tool in such a manner as to snugly engage each side of the cutting blade whereby the blade is rubbed as it reciprocates and is thus continuously steeled during operation to dress the cutting edges.

Referring to the drawings, the preferred form of the device is shown therein, and in Fig. 1 the guard elements are indicated as 10 and 11, the cutting blade being denoted as 12. The guard member 10, as best shown in Fig. 2, is fixedly mounted from the handle 13 by means of a bolt 14 and a centering pin 15. The guard member 11 is supported from the handle 13 and guard 10 in a "floating" manner and for this purpose is mounted upon a centering pin 16 at the handle and at its opposite end from a spring clip 20 integral with guard member 10. The spring clip 20 is provided with a pin 21 upon which guard 11 may be centered. A leaf spring 22 is provided adjacent pin 16, and spring clip 20 and leaf spring 22 urge the floating guard 11 toward the relatively fixed guard 10. When replacing a cutting blade, the guard member 11 may be quickly removed from the knife by taking out the centering pin 16 and springing the guard member 11 from off of the centering pin 21.

The reciprocally-driven cutting blade 12 is mounted to move between the guard members 10 and 11 and the blade 12 is removably carried at the outer end of a reciprocating drive element 31 slidably mounted in a bearing 29 fixed in the handle. The element 31 may be reciprocated by any suitable drive means and it has been found quite satisfactory to use a flexible cable 32 to transmit motion from a motor 35 to the handle 13 which contains a suitable gear and crank mechanism 36 to convert the rotary motion to a reciprocating the outer end of a reciprocating drive element 31 is bifurcated to provide a slot 33 to receive the inner end of the knife blade, one branch of the bifurcated end of the drive element being longer than the other. The longer branch carries a centering pin 34 which interfits with an aperture provided in the knife blade to fix it to the drive element, and the pin and the slot cooperate with the end of the knife to hold it projected outwardly in a fixed position with respect to the drive element 31.

The working edges of each of the guard elements 10 and 11 and of the knife blade 12 are serrated as above explained to provide a set of shearing edges for cutting fibers falling between the teeth; such, for example, as in skinning cattle, the fibers of the fell layer holding the skin to the carcass. The teeth at the edges of the guard members 10 and 11 are preferably arranged oppositely to each other while the teeth on the cutting blade are formed slantwise across the edge of the cutting blade for a purpose that will appear more fully below. Thus, the cutting blade teeth are preferably ground across the blade on an angle of between 30° to 45° as best seen in Fig. 5. The teeth on the guard members are designed to have a pitch approximately three to four times that of the pitch of the teeth on the cutting blade, and the cutting blade has a stroke about equal to the pitch of the teeth on the guard members.

The guard teeth are spaced wide enough apart to let fibers into the shearing edges, and for skinning cattle, the guard teeth are spaced about 1/4" apart. This spacing for cattle skinning permits the fell fibers to enter into the serration of the guards and the cutting blade while the skin and carcass surface can not ordinarily bend sharply enough to fall into the cutting means. The blade teeth are designed to be of a size to permit fibers to readily fall between them and, in general, the more teeth there are on the blade, the more extensive will be the shearing surface. For skinning cattle, blade teeth about 1/16" apart have been found best; a smaller distance tends to prevent the fell fibres falling into the serrated edge; yet, on the other hand, if the teeth are larger, the extent of the shearing surface is reduced. Thus, for skinning cattle, teeth on the blade are preferably ground on a 1/16" pitch with the guard teeth being spaced apart about 3/16" to 1/4".

The cutting blade is designed to have a length such that when moved to the outer end of its stroke, approximately two teeth on the blade 12 will project beyond the last pair of teeth A and B (Fig. 5) on the guard elements. Thus, as the blade reciprocates, the two end teeth on the blades will alternately project beyond the last pair of the teeth on the guards and then be drawn inwardly between the guard members a distance approximately equal to two cutting blade teeth.

The blade is reciprocated quite rapidly and as the knife is pushed into the fell layer of the cattle carcass, the fibers of the fell fall into the space between the teeth on the cutting blade and are sheared upon being moved against the teeth on the guard members. As the knife drives in one direction or the other, fibers of the fell layer are sheared when the teeth on the cutting blade pass the teeth on the guard members. Due to the angular formation of the cutting blade teeth, it is seen that first one edge of a given tooth on the cutting blade will pass one edge of the oppositely disposed guard member teeth, and thereafter the other edge of the given blade tooth will pass into cutting relation with respect to the other member of the pair of guard teeth.

The disposition of the cutting blade teeth on an angle as clearly shown in Fig. 5 is important for the reason that whenever a particular fell fiber is caught between a blade tooth and a guard tooth, it is severed in only one point. This reduces the energy required to sever the fell layer to a minimum and eliminates the presence of fell fiber particles. It is obvious that if the teeth on the knife blade 12 were ground at an angle of 90° across the face of the cutting edge, a fiber trapped between the teeth on the cutting blade and a pair of teeth on the guard members would be simultaneously cut at two points as the cutting blade moved along. This would require twice the cutting force and a discrete fell fiber particle equal in length to the width of the blade would be produced. This possibility is avoided by disposing the guard teeth with respect to the cutting blade so that first one edge of the cutting blade tooth passes a guard tooth and then the other edge of that cutting blade tooth passes the second guard member tooth. The same effect may be accomplished by disposing the teeth on the guard members slightly off center with respect to each other rather than directly opposite to each other.

In using this knife during the cattle-skinning operation, the nose of the knife, which is tapered to a rather thin point, is first inserted between the skin and the surface of the carcass to begin the separation of the fell layer. In general, the same system of separating the skin from the carcass is followed when using the power knife here described as is now practiced in manual skinning. While the carcass is held suspended from its hind legs, the knife is first inserted between the skin and the surface of the carcass at a point along a cut extending lengthwise of the belly of the carcass and a portion of the belly and each of the hind legs is cleared. Then the foreleg and neck section is operated upon. After the skin at the foreleg and neck area has been separated, the skin is freed from over the chest and shoulders of the carcass. The operator then goes back to the hind end and cuts the skin from the rump, leaving it still attached to the tail. The back area is then skinned with long sweeping cuts, always leaving the skin hanging from an area near the rump. After the back has been finally cleared, the skin is pulled free from the carcass by stripping it from the tail. To expedite the skinning operation, the skin along the inside of the hind and forelegs is opened manually as conventional in "cutting the pattern." Thereafter, however, the power knife is used to separate the skin from the legs and remainder of the carcass.

The pointed or tapered nose portion of the knife serves during the skin opening operation and also fits into close quarters so that the power knife may be used around the sharp curves found at the shoulders and at other points around the carcass. It is important that the cutting blade have a stroke sufficiently long to project several teeth beyond the last pair of guard teeth as above explained, so that the fell layer in front of the nose section of the knife will be cut. If this is not done, a heavier pushing force is required to drive the nose area of the knife, i. e. the pair of teeth A and B of guards 10 and 11, Fig. 5, through the fell layer.

In clearing the broad sections of the back, rump, and over the neck, long sweeping strokes may be made. As the operator moves the knife, first in one direction and then the other, the knife must be turned to present the shearing edge against the fell layer. It is conceivable that a shearing edge could be provided on each edge of the knife; however, this construction with its attendant complications has not been found necessary because of the arrangement made for connecting the drive means 32 to the handle 13. If, as above stated, a flexible cable is preferably used to transmit rotary power from a motor to the motion-converting means in the handle, the cable 32 may be connected to the handle through a suitable bearing joint such that the handle may rotate with respect to the fixed outer sheath of the cable. When such a connection is provided, the reaction of the handle 13 with respect to the inside drive member of the cable 32, will cause the handle to rotate if it is free. Thus if the operator momentarily relaxes his grip on the knife at either end of the long sweeping stroke, the knife will quickly spin so that the operator can grab it after it has turned through approximately 180° and the knife may then be moved in the opposite direction. In following this practice, the knife may be quickly reversed without effort on the part of the operator and only a single cutting edge need be provided.

The use of a thin blade snugly positioned between the two guards has a particular advantage in that the weight of the reciprocating parts is minimized. Such structure makes possible the use of a lightweight, rapidly-moving drive mechanism.

Further, with the structure described above, the relatively thin cutting blade 12 is constrained to a movement between the two guard members 10 and 11. The guard members are preferably made of a harder material than the blade and, in any event, the blade is snugly positioned between the guard members such that a close rubbing contact results. This is occasioned by the resilient and "floating" mounting of the guard member 11 so that it is biased toward the fixed guard member 10. The tension on the spring clip 20 and leaf spring 22 is such that a sufficient pressure is maintained so as to hold the knife blade against buckling without unduly binding the blade during its reciprocation. This structure serves the dual purpose of permitting the use of a relatively heavy driving force on a thin knife blade to accomplish the required shearing action during both the pulling and pushing stroke of the cutting blade while, at the same time, providing the means for sharpening the knife as the blade reciprocates.

During use of the knife, the blade is dulled to some extent and when the guard members are held snugly against the side faces of the cutting blade, the blade is rubbed so that it is continuously steeled during use. If the cutting blade becomes quite dull, it is necessary merely to hold the knife free of the carcass and let the blade reciprocate for a few moments to again condition the cutting edge for use. By providing such an inherent steeling action, it is possible by a suitable selection of blade and guard materials to provided a knife blade that may be used for from 4 to 8 hours at a time without requiring honing or grinding.

Figs. 6 and 7 illustrate a form of the invention utilizing a wedge-shaped knife formed by the tapered guard blades 45 and 46, between which is positioned the thin cutting blade 47. In the embodiment illustrated, the lower edges of the guard blade teeth are milled off as illustrated at 48 to form the wedge-shaped teeth. The lower ends of the teeth are rounded off as illustrated at 49 to form a smooth nose at the end of the guard blade teeth. The remaining structure of the knife is substantially identical with that previously described in conjunction with Figs. 1 through 5.

Fig. 7 illustrates the action of the knife in separating the skin 51 from the remainder of the carcass 52. The wedge-shaped nose of the knife formed by flats 48 and the rounded noses 49 holds the skin and the carcass apart in the form of a V, exposing the plurality of small fibers 53 at the point of the V holding the skin to the meat. The cutting blade 47, the teeth of which project slightly beyond the rounded ends of the two guard blades 45 and 46, catches the fibers 53 and by its movement pulls them against the guard blade teeth to continuously snip the fibers. A slight pressure on the knife will push the nose of the knife into the cut area, wedging the skin 51 away from the remainder of the carcass 52 to further expose additional fibers 53 to be cut.

Preferably, the teeth of the cutting blade 47 extend beyond the teeth of the guard blades 45 and 46 approximately one-third the depth of the cutting blade teeth. In the embodiment illustrated in Figs. 6 and 7, the spacing of the cutting blade teeth is $\frac{1}{16}''$ and their depth is approximately $\frac{1}{16}''$. Thus, if a plane were placed across the ends of the rounded noses 49 of the guard blades 45 and 46, the cutting blade 47 would project preferably about .020" beyond that plane.

In order not to complicate the illustration of Fig. 7, no effort has been made to show how the relatively wide spacing of the guard blade teeth permits the skin and flesh to work into the openings between those teeth in a position where they are close to the teeth of the cutting blade 47. However, a study of Fig. 6 will illustrate the fact that in addition to the guard blade teeth being wedge-shaped so as to permit the apex of the wedge to be inserted close to the skin and flesh, the teeth are widely spaced with relation to the teeth of the cutting blade 47 with the root 54 of the guard teeth well above the remaining portions of the tooth lying in a corresponding longitudinal plane.

The use of a small number of guard blade teeth with respect to the number of cutting blade teeth thus reduces the obstruction to the sides of the cutting blade teeth and better exposes said cutting blade teeth to reach in close to the skin and flesh, while, at the same time, not materially reducing the speed of cutting of the knife. As each of the small teeth on the cutting blade passes a large tooth on the guard blades, there is a snipping of the fibers caught therebetween, and a large movement of the cutting blade is not required to produce one severing action between the cutting blade and a guard blade.

The foregoing description is for the purpose of complying with Section 4888 of the Revised Statutes and should not be construed as imposing any unnecessary limitations on the appended claims. It is conceivable that modifications may occur to those skilled in the art, which modifications are within the scope of the invention as defined by the following claims.

I claim:

1. A device for skinning cattle and the like including handle means, a pair of elongated guard blades, each having an elongated, serrated edge, a reciprocally-driven, elongated cutting blade disposed between said guard blades and having an elongated, serrated edge adjacent the serrated edges of said guard blades, one end of one of said guard blades being attached to said handle means, the corresponding end of the other of said guard blades being pivotally connected to said handle means, a clip interconnecting the other ends of said guard blades and urging said other ends of said guard blades toward each other, and spring means urging said one end of the other of said guard blades toward the corresponding end of the one guard blade.

2. A device for skinning cattle and the like including handle means, a pair of elongated guard blades, each having an elongated, serrated edge forming relatively pointed teeth, the points of said teeth of said two guard blades being positioned in a common plane, a reciprocally-driven, elongated cutting blade disposed between said guard blades and having an elongated, serrated edge forming teeth said serrated edge of said cutting blade being adjacent the serrated edges of said guard blades, said serrated edge of said cutting blade being positioned out of said plane a distance such that said serrated edge of the cutting blade projects beyond the said plane a distance less than the depth of said teeth, one end of one of said guard blades being attached to said handle means, the corresponding end of the other of said guard blades being pivotally connected to said handle means, a clip interconnecting the other ends of said guard blades and urging said other ends of said guards blades toward each other, and spring means urging said one end of the other of said guard blades toward the corresponding end of the one guard blade.

3. A device for skinning cattle and the like including handle means, a pair of elongated guard blades, each having an elongated, serrated edge forming relatively pointed teeth, the points of said teeth of said two guard blades being positioned in a common plane, said blades being attached to said handle means, and a reciprocally-driven, elongated cutting blade disposed between said guard blades and having an elongated, serrated edge forming teeth, said serrated edge of said cutting blade being adjacent the serrated edges of said guard blades, said serrated edge of said cutting blade being positioned out of said plane a distance such that said serrated edge of the cutting blade projects beyond the plane a distance less than the depth of said teeth.

4. A device for skinning cattle and the like including handle means, a pair of elongated guard blades, each having an elongated edge with teeth formed thereon, said blades being attached to said handle means, the ends of said teeth of said blades being positioned in a common plane, the adjacent faces of said blades along said tooth edge being relatively flat, the other faces of said blades being rounded off adjacent the ends of said teeth, and a reciprocally-driven, thin, elongated cutting blade disposed between said guard blades, said cutting blade having teeth in the edge thereof adjacent the teeth of said guard blades, the toothed edge of said cutting blade being substantially the same length as the toothed edges of said guard blades and having a substantially greater number of teeth therein than do the corresponding edges of said guard blades, said edge of said cutting blade projecting beyond said plane a distance less than the depth of said cutting blade teeth.

5. A device for skinning cattle and the like including handle means, a pair of elongated guard blades, each having an elongated edge with teeth formed thereon, said blades being attached to said handle means, the ends of said teeth of said blades being positioned in a common plane, the adjacent faces of said blades along said tooth edge being relatively flat, the other faces of said blades being rounded off adjacent the ends of said teeth, and a reciprocally-driven, thin, elongated cutting blade disposed between said guard blades, said cutting blade having teeth in the edge thereof adjacent the teeth of said guard blades, said edge of said cutting blade projecting beyond said plane a distance substantially equal to one-third the depth of the teeth on said cutting blade.

JAMES J. PROHASKA.

REFERENCES CITED

The following references are of record in the file of this patent:

UNITED STATES PATENTS

| Number | Name | Date |
|---|---|---|
| 636,724 | Hacherelle | Nov. 7, 1899 |
| 1,326,166 | Backus | Dec. 20, 1919 |
| 1,832,993 | Masek | Nov. 24, 1931 |
| 1,838,186 | Moodhe | Dec. 29, 1931 |
| 2,488,436 | Santoro | Nov. 15, 1949 |

FOREIGN PATENTS

| Number | Country | Date |
|---|---|---|
| 340,662 | Italy | Mar. 25, 1936 |
| 730,649 | France | May 17, 1932 |